(12) United States Patent
Sah et al.

(10) Patent No.: US 8,989,930 B2
(45) Date of Patent: *Mar. 24, 2015

(54) METHOD AND APPARATUS FOR CONTROLLING AN ENGINE DISCONNECT CLUTCH IN A POWERTRAIN SYSTEM

(75) Inventors: Jy-Jen F. Sah, West Bloomfield, MI (US); Anthony H. Heap, Ann Arbor, MI (US); Lawrence A. Kaminsky, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 949 days.

This patent is subject to a terminal disclaimer.

(21) Appl. No.: 13/163,115

(22) Filed: Jun. 17, 2011

(65) Prior Publication Data

US 2012/0323418 A1 Dec. 20, 2012

(51) Int. Cl.
| | |
|---|---|
| *B60W 20/00* | (2006.01) |
| *B60W 10/06* | (2006.01) |
| *B60W 10/02* | (2006.01) |
| *B60K 6/445* | (2007.10) |
| *B60K 6/387* | (2007.10) |
| *B60W 10/08* | (2006.01) |
| *B60W 30/186* | (2012.01) |

(52) U.S. Cl.
CPC ............... *B60K 6/445* (2013.01); *B60K 6/387* (2013.01); *B60W 10/02* (2013.01); *B60W 10/06* (2013.01); *B60W 10/08* (2013.01); *B60W 20/00* (2013.01); *B60W 30/186* (2013.01); *B60W 2710/021* (2013.01); *B60W 2710/027* (2013.01); *B60W 2710/028* (2013.01); *B60W 2710/0644* (2013.01); *B60W 2710/0666* (2013.01); *B60W 2710/083* (2013.01); *B60W 20/20* (2013.01); *Y02T 10/6286* (2013.01); *Y02T 10/6239* (2013.01); *Y10S 903/93* (2013.01); *Y10S 903/945* (2013.01)
USPC ................... 701/22; 701/67; 701/69; 701/84; 701/87; 701/490; 180/65.265; 903/930; 903/945

(58) Field of Classification Search
CPC ....... B60K 6/387; B60K 6/445; B60W 10/02; B60W 10/06; B60W 10/08; B60W 20/00; B60W 30/186; B60W 2710/021; B60W 2710/027; B60W 2710/028; B60W 2710/0644; B60W 2710/0666; B60W 2710/083; B60W 20/20; Y02T 10/6239; Y02T 10/6286
USPC .............................. 180/65.265; 903/930, 945
See application file for complete search history.

(56) References Cited

U.S. PATENT DOCUMENTS

| | | | | |
|---|---|---|---|---|
| 6,176,808 | B1 * | 1/2001 | Brown et al. | 477/5 |
| 7,644,790 | B2 * | 1/2010 | Roske et al. | 180/65.22 |
| 7,690,457 | B2 * | 4/2010 | Nakanowatari | 180/65.265 |

(Continued)

OTHER PUBLICATIONS

U.S. Appl. No. 13/029,381, Michael Arnett, not pub'd.

(Continued)

*Primary Examiner* — Mary Cheung
*Assistant Examiner* — Atul Trivedi

(57) ABSTRACT

A powertrain system includes an internal combustion engine configured to transfer torque via a clutch to an input member of a hybrid transmission having torque machines configured to transfer torque thereto. Operation of the engine is controlled to facilitate a change in activation of a clutch between the engine and the input member of the hybrid transmission.

16 Claims, 3 Drawing Sheets

(56) References Cited

U.S. PATENT DOCUMENTS

| | | | |
|---|---|---|---|
| 2009/0011895 A1* | 1/2009 | Tabata et al. | 477/3 |
| 2009/0029819 A1* | 1/2009 | Tabata et al. | 475/5 |
| 2009/0098968 A1* | 4/2009 | Maguire et al. | 475/5 |
| 2009/0118882 A1* | 5/2009 | Heap et al. | 701/22 |
| 2009/0118929 A1* | 5/2009 | Heap et al. | 701/54 |
| 2009/0118937 A1* | 5/2009 | Heap et al. | 701/54 |
| 2009/0118939 A1* | 5/2009 | Heap et al. | 701/54 |
| 2009/0118941 A1* | 5/2009 | Heap | 701/54 |
| 2010/0248892 A1* | 9/2010 | Sah | 477/5 |
| 2010/0286858 A1* | 11/2010 | Otokawa | 701/22 |
| 2010/0298089 A1* | 11/2010 | Sah | 477/5 |

OTHER PUBLICATIONS

U.S. Appl. No. 13/160,937, Jy-Jen F. Sah, not pub'd.
U.S. Appl. No. 13/160,908, Sean W. McGrogan, not pub'd.
U.S. Appl. No. 13/161,584, Sean W. McGrogan, not pub'd.
U.S. Appl. No. 13/161,602, Jy-Jen F. Sah, not pub'd.
U.S. Appl. No. 13/152,380, Michael Arnett, not pub'd.
U.S. Appl. No. 13/162,720, Ryan D. Martini, not pub'd.
U.S. Appl. No. 13/163,668, Anthony H. Heap, not pub'd.
U.S. Appl. No. 13/163,115, Jy-Jen F. Sah, not pub'd.
U.S. Appl. No. 13/162,767, Sean McGrogan, not pub'd.

* cited by examiner

METHOD AND APPARATUS FOR CONTROLLING AN ENGINE DISCONNECT CLUTCH IN A POWERTRAIN SYSTEM

TECHNICAL FIELD

This disclosure is related to vehicle powertrain systems employing hybrid transmissions and an engine disconnect clutch.

BACKGROUND

The statements in this section merely provide background information related to the present disclosure. Accordingly, such statements are not intended to constitute an admission of prior art.

Powertrain systems including hybrid powertrain systems and extended-range electric powertrain systems are configured to operate in a plurality of operating modes. Such powertrain systems use torque generators, clutches and transmissions to generate and transfer torque to a driveline. Known torque generators include internal combustion engines and electric motor/generators. Known hybrid powertrain systems and extended-range electric powertrain systems include an internal combustion engine coupled via an input member to a hybrid transmission employing one or more torque machines, e.g., electric motor/generators. Torque management on known hybrid powertrain systems and extended-range electric powertrain systems includes balancing torque outputs of the internal combustion engine and the torque machines to transfer torque to an output member of a hybrid transmission in response to an operator torque request.

Known non-hybrid powertrain systems employ a torque converter between an internal combustion engine and an automatic transmission to manage torque transfer therebetween. Known hybrid powertrain systems and extended-range electric powertrain systems may include an activatable clutch element configured to couple and decouple an internal combustion engine and an input member of a hybrid transmission system. Known hybrid transmission systems manage load across locked clutches primarily through the management of torque output of the torque machines. Clutch load is managed by forcing a powertrain system to operate in such a way as to off-load torque across a target clutch during its deactivation. When torque output of the torque machines is insufficient to fully manage clutch load, i.e., offload torque from an off-going clutch due to motor capacity and/or battery limitations, engine torque may be used to fill in the gap.

SUMMARY

A powertrain system includes an internal combustion engine configured to transfer torque via a clutch to an input member of a hybrid transmission having torque machines configured to transfer torque thereto. Operation of the engine is controlled to facilitate a change in activation of a clutch between the engine and the input member of the hybrid transmission.

BRIEF DESCRIPTION OF THE DRAWINGS

One or more embodiments will now be described, by way of example, with reference to the accompanying drawings, in which:

FIGS. 2-1 and 2-2 illustrate control scheme flowcharts, each including sequentially executed steps to effect a change in activation of an engine disconnect clutch in accordance with the disclosure.

DETAILED DESCRIPTION

Figure 1:
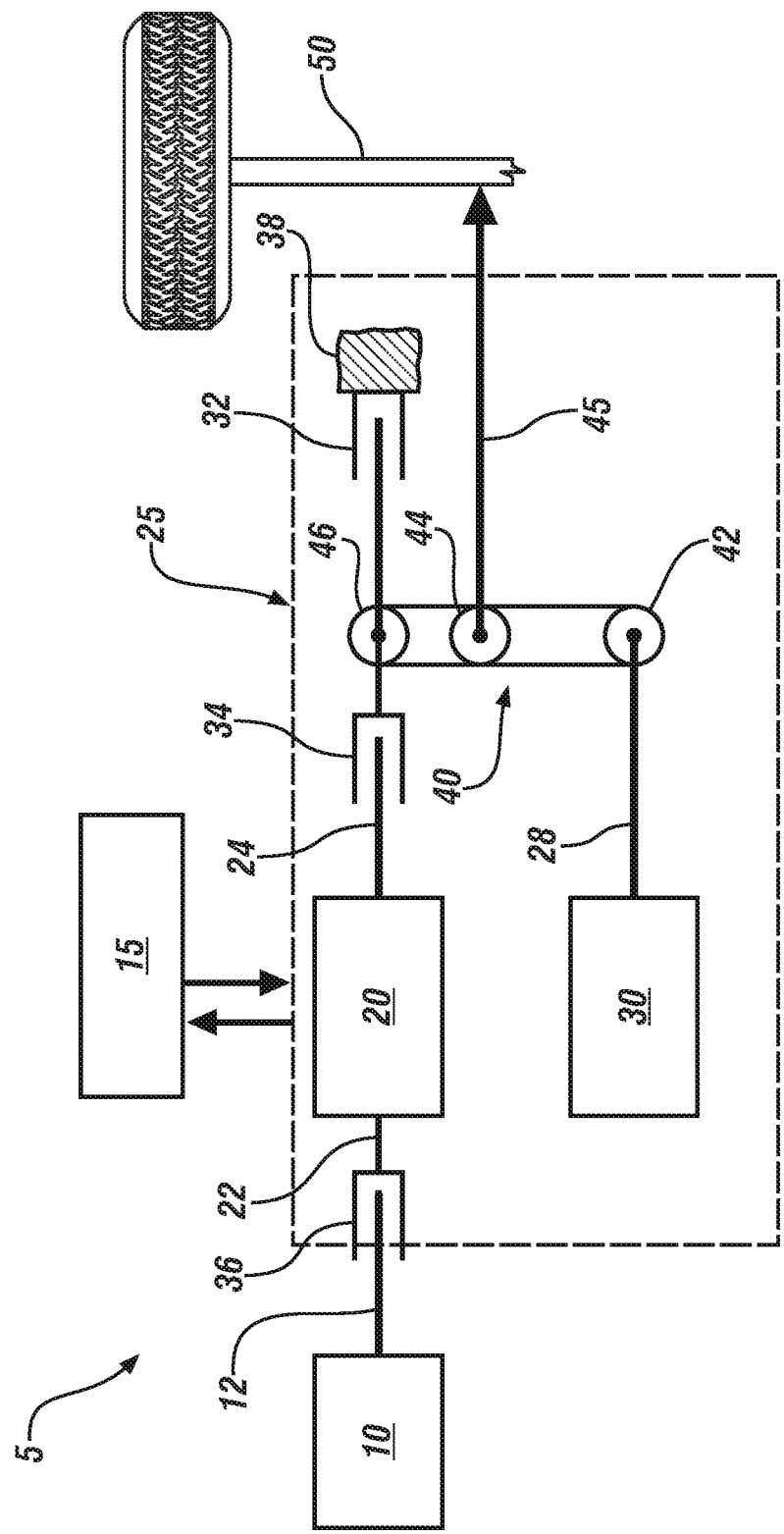
FIG. 1 illustrates an exemplary powertrain system including an internal combustion engine and a hybrid transmission including first and second torque machines in accordance with the disclosure.

Referring now to the drawings, wherein the showings are for the purpose of illustrating certain exemplary embodiments only and not for the purpose of limiting the same, FIG. 1 illustrates an exemplary powertrain system 5 including an internal combustion engine 10 and a hybrid transmission 25 including first and second torque machines 20 and 30, respectively, and a planetary gear set 40. The powertrain system 5 is coupled to a driveline 50 to transfer tractive torque thereto. The internal combustion engine 10 and the first and second torque machines 20, 30 are any machines. In one embodiment, the first and second torque machines 20, 30 are multiphase electric motor/generator devices that electrically connect to a high-voltage power source via an electric power inverter. A control module 15 is configured control operation of the powertrain system 5. The powertrain system 5 as shown is configured for use in an extended-range electric vehicle (EREV) configuration, with the concepts described herein applicable to other powertrain and vehicle configurations. As such, the powertrain system 5 is meant to be illustrative but not limiting.

The internal combustion engine 10 is configured to execute an autostop event and an autostart event during ongoing powertrain operation. An autostop event occurs when engine operation is discontinued and the internal combustion engine 10 is in an OFF state and is not rotating during ongoing powertrain operation to conserve fuel. An autostart event is executed subsequent to executing an autostop event to start or restart engine operation during ongoing powertrain operation. The engine 10 may be started to transfer tractive torque to the driveline 50 and/or to provide power to the first torque machine 20 to generate energy that may be used to generate tractive torque by one or both the first and second torque machines 20, 30.

The powertrain system 5 includes first, second, and third torque-transfer devices C1 32, C2 34, and C3 36, respectively, which may be any suitable clutch elements, e.g., friction clutch packs, brakes, band clutches, and one-way clutches. All torque transfer devices are simply referred to herein as clutches. The first clutch C1 32 is a brake element that is configured to couple a ring gear element 46 of the planetary gear set 40 to a transmission case ground 38 when activated. The second clutch C2 34 is configured to couple the ring gear element 46 of the planetary gear set 40 to an output member 24 of the first torque machine 20 when activated. The third clutch C3 36 is an engine disconnect clutch and is configured to couple an input member 22 of the first torque machine 20 to an output member 12 of the engine 10 when activated. The third clutch C3 36 is configured to completely decouple the input member 22 of the first torque machine 20 from the output member 12 of the engine 10 when deactivated. An input member 28 of the second torque machine 30 couples to a sun gear element 42 of the planetary gear set 40. An output member 45 coupled to a planet gear assembly 44 of the planetary gear set 40 couples to the driveline 50. It is appreciated that this powertrain configuration is meant to be illustrative.

Table 1 describes clutch activations associated with specific operating modes of the powertrain system of FIG. 1. The term 'x' indicates that the specific clutch is activated when in the corresponding operating mode. Each of the operating modes is indicated by the activated clutch(es), if any.

TABLE 1

| Operating Mode | C1 | C2 | C3 |
|---|---|---|---|
| Neutral 1 | | | |
| Neutral 2 | | | x |
| Mode 1 (1 motor EV) | x | | |
| Mode 2 (2 motor EV) | | x | |
| Mode 3 (Series) | x | | x |
| Mode 4 (Load Share) | | x | x |
| Transition Mode | x | x | |

Specific ones of the powertrain elements, e.g., the internal combustion engine 10 and the first and second torque machines 20, 30 are configured to generate tractive torque, if any, in the various operating modes in response to load demands including an operator torque request. "EV" indicates electric vehicle operation, i.e., tractive torque being generated by one or both of the first and second torque machines 20, 30. The engine 10 is preferably in the OFF state during the electric vehicle operation, although such operation is not required.

The first neutral mode (Neutral 1) indicates that no tractive torque is being generated, and it is accomplished with the first, second, and third torque-transfer clutches C1 32, C2 34, and C3 36, respectively, being deactivated.

The second neutral mode (Neutral 2) indicates that no tractive torque is being generated, and it is accomplished with the first and second torque-transfer clutches C1 32 and C2 34 being deactivated. The third torque-transfer clutch C3 36 is activated, permitting torque transfer between the engine 10 and the first torque machine 20. This may include electric power generation, i.e., power flow from the engine 10 to the first torque machine 20. This may include engine starting, i.e., power flow from the first torque machine 20 to the engine 10.

Mode 1 (1 motor EV) is an electric vehicle mode wherein tractive torque is generated by one of the torque machines. In this embodiment, the second torque machine 30 generates tractive torque and the engine 10 and the first torque machine 20 are decoupled from the driveline 50 by deactivation of the second and third torque-transfer clutches C2 34 and C3 36. The first torque-transfer clutch C1 32 is activated to ground the ring gear 46 to transfer torque and speed of the second torque machine 30 to the driveline 50.

Mode 2 (2 motor EV) is an electric vehicle mode wherein tractive torque is generated by both the first and second torque machines 20, 30. The engine 10 is decoupled from the driveline 50 by deactivation of the third torque-transfer clutch C3 36. The second torque-transfer clutch C2 34 is activated to combine and transfer torque and speed from the first and second torque machines 20, 30 through the planetary gear set 40 to the driveline 50.

Mode 3 (Series) is a series-hybrid mode wherein tractive torque is generated by the second torque machine 30 and the engine 10 is coupled to the first torque machine 20 by activation of the third torque-transfer clutch C3 36 to generate electric power that is preferably used by the second torque machine 30. The engine 10 is decoupled from the driveline 50 by deactivation of the second torque-transfer clutch C2 34. The first torque-transfer clutch C1 32 is activated to ground the ring gear 46 to transfer torque and speed of the second torque machine 30 to the driveline 50.

Mode 4 (Load Share) is an engine-on load share mode wherein tractive torque is generated by both the first second torque machines 20, 30, and the engine 10 by activation of the second torque-transfer clutch C2 34 and the third torque-transfer clutch C3 36. The first torque-transfer clutch C1 32 is deactivated. The second torque-transfer clutch C2 34 and the third torque-transfer clutch C3 36 are activated to combine and transfer torque and speed from the engine 10 and the first and second torque machines 20, 30 through the planetary gear set 40 to the driveline 50.

The Transition Mode is an operating mode that is preferably utilized exclusively during mid-shift between Mode 3 (series-hybrid mode) and Mode 4 (load share mode), and between Mode 1 (1 Motor EV mode) and Mode 2 (2 Motor EV mode). The Transition Mode includes operating the powertrain system with the first torque-transfer clutch C1 32 activated, the second torque-transfer clutch C2 34 activated and the third torque-transfer clutch C3 36 deactivated.

Figures 1, 2:
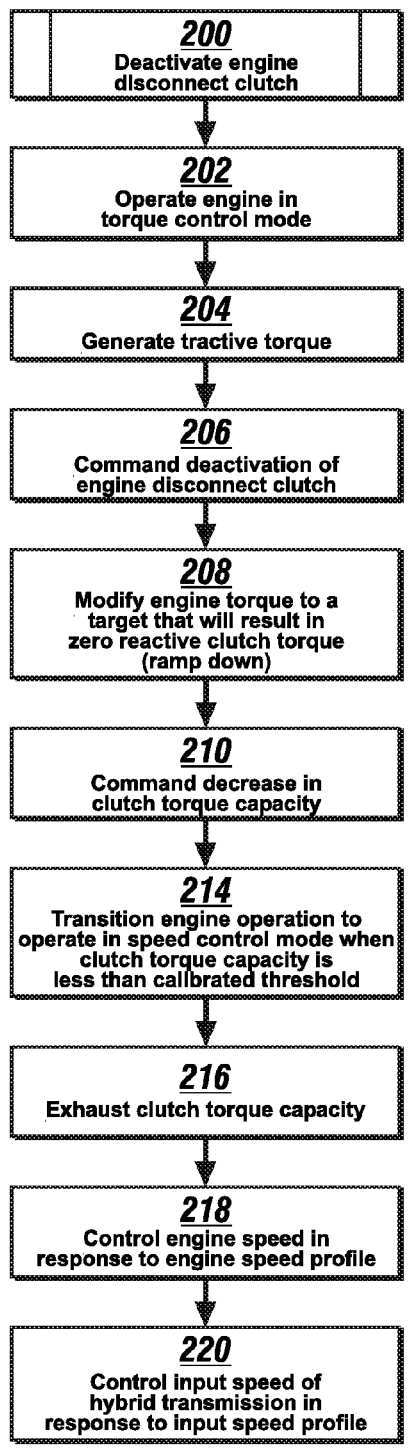
Figure 2:
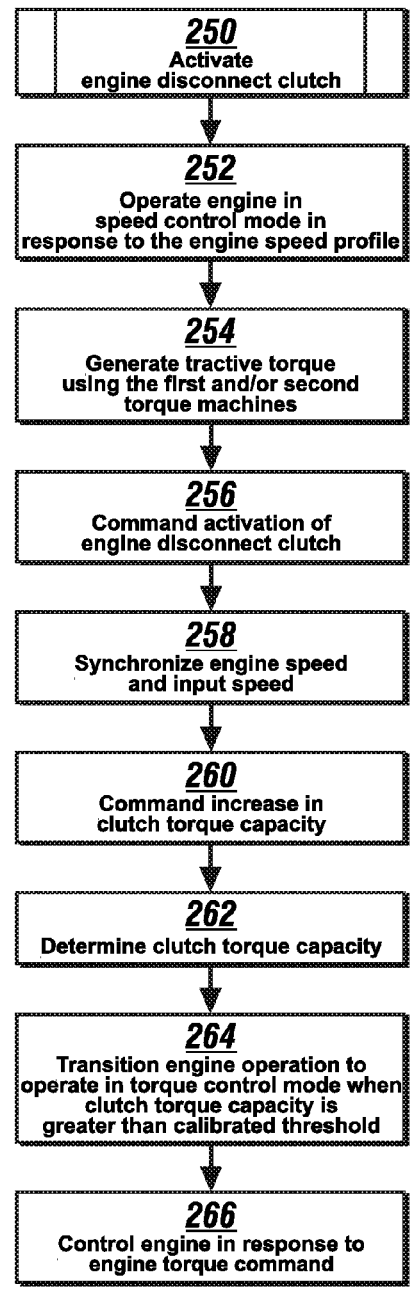

FIGS. 2-1 and 2-2 illustrates control schemes 200 and 250, respectively, as flowcharts that include sequentially executed steps to effect a change in activation of an engine disconnect clutch during operation of a powertrain system. The control schemes 200 and 250 are described with reference to the powertrain system 5 including internal combustion engine 10 and hybrid transmission 25 including first and second torque machines 20 and 30 shown in FIG. 1.

Figure 3:
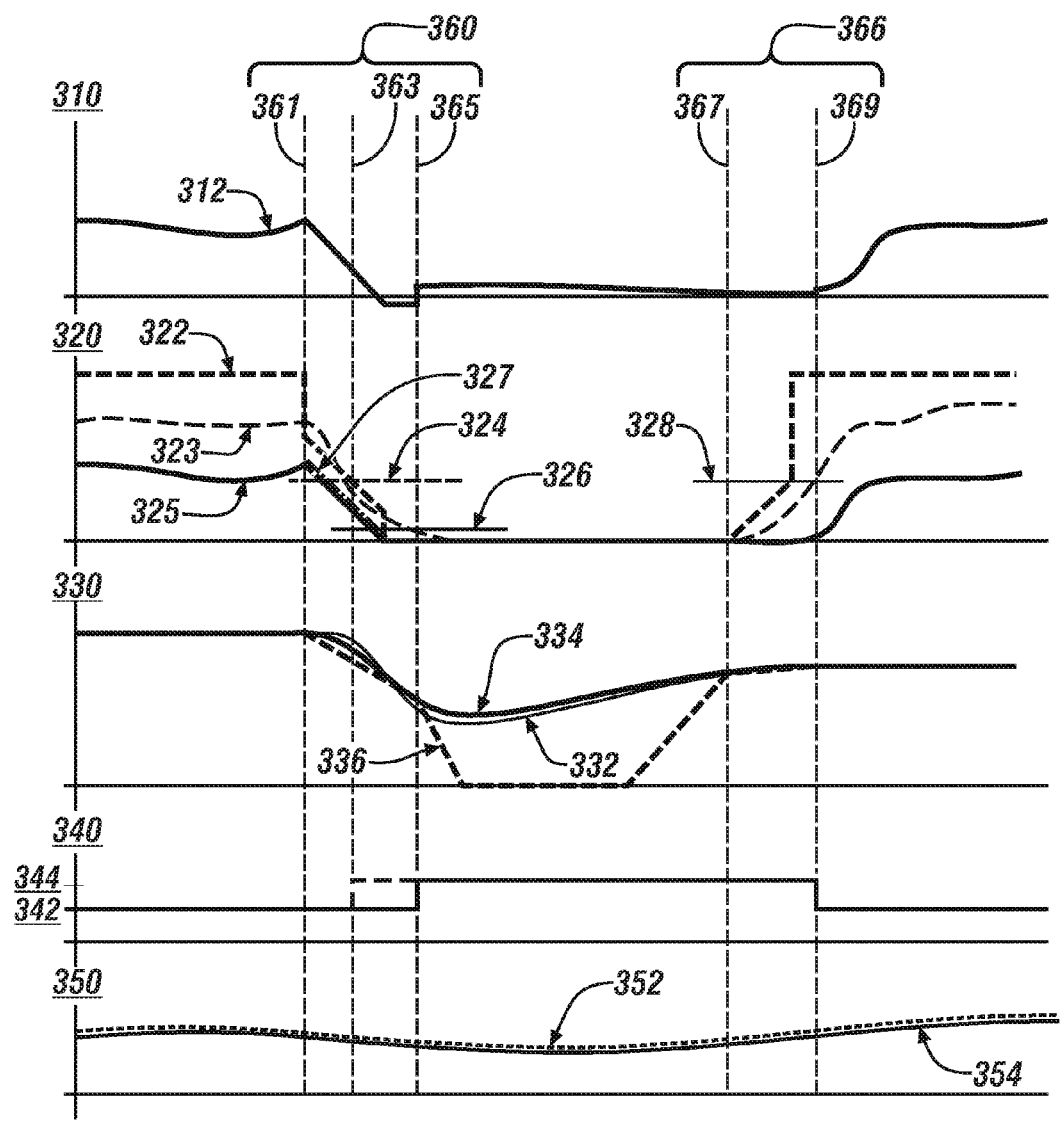
FIG. 3 illustrates time-coincident powertrain operating parameters associated with execution of the control schemes described with reference to FIGS. 2-1 and 2-2 in accordance with the disclosure.

FIG. 3 illustrates time-coincident powertrain operating parameters associated with execution of the control schemes 200 and 250, as described herein. The time-coincident powertrain operating parameters are graphically depicted on axes including engine torque (310), clutch torque (320), engine speed (330), engine control mode (340), and output torque (350).

In response to a command to change activation of the engine disconnect clutch, operations of the torque machines are controlled to generate an output torque at an output member of the hybrid transmission responsive to an operator torque request and controlling input speed or another internal speed of the transmission to an operating point that achieves an optimum efficiency. Coincidentally, the engine is controlled to facilitate the change in activation of the clutch between the engine and the input member of the hybrid transmission by managing the load being transmitted by the clutch. When the clutch is being deactivated, the engine torque is controlled such that the load across the clutch is reduced prior to deactivating the clutch, e.g., by reducing hydraulic clutch pressure. When the clutch is being activated, the engine torque is controlled such that the load across the clutch is managed as the torque capacity of the clutch increases, e.g., by increasing hydraulic clutch pressure.

The control scheme 200 is described with reference to the illustrated powertrain system 5 depicted with reference to FIG. 1 to effect deactivation of the engine disconnect clutch, i.e., the third torque-transfer clutch C3 36.

Table 2 is provided as a key to FIG. 2-1 wherein the numerically labeled blocks and the corresponding functions are set forth as follows. The control scheme 200 is implemented as one or a plurality of routines that are executed in the control module 15.

TABLE 2

| FIG. 2-1 | |
|---|---|
| BLOCK | BLOCK CONTENTS |
| 200 | Deactivate engine disconnect clutch |
| 202 | Operate engine in torque control mode |
| 204 | Generate tractive torque |

TABLE 2-continued

FIG. 2-1

| BLOCK | BLOCK CONTENTS |
|---|---|
| 206 | Command deactivation of engine disconnect clutch |
| 208 | Modify engine torque to a target that will result in zero reactive clutch torque (ramp down) |
| 210 | Command decrease in clutch torque capacity |
| 214 | Transition engine operation to operate in speed control mode when clutch torque capacity is less than calibrated threshold |
| 216 | Exhaust clutch torque capacity |
| 218 | Control engine speed in response to engine speed profile |
| 220 | Control input speed of hybrid transmission in response to input speed profile |

As used herein, 'reactive torque' refers to magnitude of torque that is being transferred, 'clutch reactive torque' refers to magnitude of torque that is being transferred across a clutch, often referred to as clutch load, and 'clutch torque capacity' refers to a magnitude of torque that the clutch is capable of transferring.

The control scheme 200 includes an initial operating scheme with the engine operating in a torque control mode (shown as 342 in FIG. 3) in response an output torque request (shown as 352 in FIG. 3) (202). Actual output torque (shown as 354 in FIG. 3) is shown for comparison. An engine torque command (shown as 312 in FIG. 3) is generated in response to the output torque request. The engine disconnect clutch is activated, and thus the engine speed (shown as 332 in FIG. 3), engine speed profile (shown as 334 in FIG. 3), and the input speed (shown as 336 in FIG. 3) are equal. A clutch torque capacity command (shown as 322 in FIG. 3) is at a maximum value.

An estimated clutch torque capacity (shown as 323 in FIG. 3) is greater than an estimated clutch reactive torque (shown as 325 in FIG. 3), indicating the engine disconnect clutch is capable of transferring engine torque generated in response to the engine torque command A reactive torque constraint (shown as 327 in FIG. 3) is initially equal to the estimated clutch torque capacity. During operation prior to time point 361, the reactive torque constraint is dictated by the estimated clutch torque capacity. During operation beginning at time point 361, the estimated clutch reactive torque is equal to the reactive torque constraint. Tractive torque is generated (204), with source of the tractive torque dependent upon the operating mode, i.e., one of Modes 1, 2, 3, and 4. For example, when operating in Mode 3 (Series) is a series-hybrid mode wherein tractive torque is generated only by the second torque machine 30.

In response to a command to deactivate the engine disconnect clutch (shown as initiating at time point 361 of time period 360 in FIG. 3) (206), the engine torque command is modified to achieve a target that will result in zero reactive clutch torque (208). Thus, the engine torque command is ramped down to manage the reactive torque across the engine disconnect clutch. Thus, the engine torque command may be either increased or decreased as necessary to ensure that the system is able to operate within the estimated clutch torque capacity of the engine disconnect clutch for any output torque request with corresponding acceleration changes in the hybrid transmission. Coincidentally, torque commands for controlling operations of the first and second torque machines 20, 30 to generate an output torque responsive to the output torque request are determined, and depend upon the operating mode of the powertrain system. The engine torque command decreases as necessary to ensure that the reactive torque across the engine disconnect clutch is within the clutch torque capacity of the engine disconnect clutch.

The reactive torque constraint imposes a limit on the estimated clutch reactive torque in response to the command to deactivate the engine disconnect clutch. In response, the engine torque is modified, which includes a command to decrease to a target torque that results in zero reactive clutch torque, preferably in a ramp-down manner to offload the clutch reactive torque in response to the command to deactivate the engine disconnect clutch.

Coincident with modifying the engine torque command, the clutch torque capacity command is decreased, initially to be equal to the magnitude of the estimated clutch reactive torque plus a calibratable margin at time point 361, and decreasing coincident with the decrease in the engine torque command (210). The calibratable margin ensures there is sufficient clutch torque capacity to transfer torque during offload of the clutch reactive torque prior to clutch deactivation. The clutch reactive torque constraints are thus reduced in order to effect the torque offload of the clutch. As a result, the estimated clutch torque capacity is reduced in such a way as to not fall below the estimated clutch reactive torque until the system is ready to release the clutch, i.e., until the estimated clutch reactive torque has reached its target, typically zero or near-zero.

The clutch reactive torque constraint is the primary constraint that is used to facilitate the offload of the clutch reactive torque. The clutch torque capacity command is a function of the load as offload of the clutch reactive torque occurs. The clutch torque capacity command maintains the same calibratable margin above the estimated clutch reactive torque while clutch torque offload is occurring. Thus, the engine torque command is modified as necessary to ensure that the system is able to operate within the clutch torque capacity of the engine disconnect clutch.

When the estimated clutch torque capacity is less than a threshold (shown as 324 occurring at time point 363 in FIG. 3), the engine operation transitions to operating in the speed control mode (shown as 344 in FIG. 3) (214). Alternatively, when the estimated clutch torque capacity is less than a released capacity threshold (shown as 326 occurring at time point 365 in FIG. 3), the engine operation transitions to operating in the speed control mode. The clutch torque capacity is subsequently exhausted (216). The engine speed control mode is employed to control the engine speed (shown as 332 in FIG. 3) in response to an engine speed profile (shown as 334 in FIG. 3) (218). The input speed associated with rotation of the input member of the hybrid transmission (shown as 336 in FIG. 3) is controlled in response to an input speed profile (shown as 336 in FIG. 3) (220).

When the engine disconnect clutch is deactivated, the control system controls engine speed through management of engine torque. This may be accomplished through monitoring engine speed feedback within the engine controller with a close-to-zero N-m feed-forward load, or through a torque control mode with the engine controller receiving engine torque commands from another controller that is determining the engine torque commands based on observing speed feedback. When the engine disconnect clutch is deactivated, the torque machines no longer affect the engine speed and are free to be controlled independently of engine speed. This is managed by controlling the transmission side.

FIG. 2-2 illustrates control scheme 250 in flowchart form that includes steps that are sequentially executed to effect a change in activation of the third torque-transfer clutch C3 36, i.e., the engine disconnect clutch. The control scheme 250 is described with reference to the powertrain system 5 depicted with reference to FIG. 1 to effect activation of the third torque-transfer clutch C3 36, i.e., the engine disconnect clutch.

Table 3 is provided as a key to FIG. 2-2 wherein the numerically labeled blocks and the corresponding functions are set forth as follows. The control scheme 250 is implemented as one or a plurality of routines that are executed in the control module 15.

TABLE 3

FIG. 2-2

| BLOCK | BLOCK CONTENTS |
|---|---|
| 250 | Activate engine disconnect clutch |
| 252 | Operate engine in speed control mode in response the engine speed profile |
| 254 | Generate tractive torque using the first and/or second torque machines |
| 256 | Command activation of engine disconnect clutch |
| 258 | Synchronize engine speed and input speed |
| 260 | Command increase in clutch torque capacity |
| 262 | Determine clutch torque capacity |
| 264 | Transition engine operation to operate in torque control mode when clutch torque capacity is greater than calibrated threshold |
| 266 | Control engine in response to engine torque command |

The control scheme 250 activates the engine disconnect clutch. The engine is operating in the speed control mode (shown as 344 in FIG. 3) in response the engine speed profile (shown as 334 in FIG. 3) (252). Tractive torque is generated using the first and/or second torque machines exclusively, with no torque input in any form from the engine (254). The engine disconnect clutch is commanded to be activated (256). This includes coordinating the control of the input speed profile (shown as 336 in FIG. 3) and the engine speed profile (shown as 334 in FIG. 3) in order to synchronize the speeds of the elements of the engine disconnect clutch, i.e., the output member of the engine and the input member of the hybrid transmission. The engine speed is controlled to a target speed, and the input speed is controlled by controlling speeds of the first and second torque machines to synchronize with the engine speed to achieve clutch synchronization (shown as occurring at time point 367 of time period 366 in FIG. 3) (258).

The clutch torque capacity command (shown as 322 in FIG. 3), the estimated clutch torque capacity (shown as 323 in FIG. 3), and the estimated clutch reactive torque (shown as 325 in FIG. 3) are initially at minimum values at time point 367. The commanded clutch torque capacity is increased (260), which includes an initial ramping up of the clutch torque capacity command, and then a step increase in the clutch torque capacity command. There is a corresponding increase in the estimated clutch torque capacity that is determined (262). When the estimated clutch torque capacity exceeds a calibratable threshold 328 (shown as occurring at time point 369 in FIG. 3), the engine operation transitions to operating in the torque control mode (264). The calibratable threshold 328 preferably selected as a magnitude of the estimated clutch torque capacity that corresponds to an estimated clutch reactive torque to respond to and transfer torque in response to the engine torque command (shown as 312 in FIG. 3). As the clutch torque capacity of the engine disconnect clutch increases, the engine torque command is modified to increase, thereby transmitting torque through the clutch (266). The engine torque command increases as necessary to ensure that the system is able to operate within the clutch torque capacity of the engine disconnect clutch. Thus, operation of the engine is controlled to achieve the change in activation of the clutch between the engine and the input member of the hybrid transmission.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain system including an internal combustion engine configured to transfer torque via a clutch to an input member of a hybrid transmission having torque machines configured to transfer torque thereto, the method consisting of:
controlling operation of the engine to facilitate a change in activation of a clutch between the engine and the input member of the hybrid transmission, comprising managing a reactive torque load across the clutch by modifying an engine torque command to achieve a balance between a torque output of the internal combustion engine and a torque output of the torque machines.

2. Method for controlling a powertrain system including an internal combustion engine configured to transfer torque via activation of a clutch to an input member of a hybrid transmission having torque machines configured to transfer torque thereto, the method comprising:
commanding a change in activation of the clutch;
controlling operations of the torque machines to generate an output torque at an output member of the hybrid transmission responsive to an operator torque request; and
coincidently controlling operation of the engine to achieve the change in activation of the clutch between the engine and the input member of the hybrid transmission, comprising managing a reactive torque load across the clutch by modifying an engine torque command to achieve a balance between a torque output of the internal combustion engine and a torque output of the torque machines.

3. The method of claim 2, wherein the change in activation of the clutch comprises a deactivation of the clutch, and wherein coincidently controlling operation of the engine comprises modifying engine torque to reduce a load on the clutch prior to the deactivation of the clutch.

4. The method of claim 3, wherein modifying engine torque to reduce the load on the clutch prior to the deactivation of the clutch comprises modifying engine torque to reduce a clutch reactive torque.

5. The method of claim 4, further comprising controlling operation of the engine in an engine speed control mode subsequent to the deactivation of the clutch.

6. The method of claim 3, wherein the deactivation of the clutch comprises exhausting a clutch torque capacity, and wherein modifying engine torque occurs prior to exhausting the clutch torque capacity.

7. The method of claim 2, wherein commanding the change in activation of the clutch comprises commanding a change in activation of the clutch from an activation state to a deactivation state.

8. The method of claim 2, wherein coincidently controlling operation of the engine comprises synchronizing the engine speed with a speed of the input member of the hybrid transmission prior to an activation of the clutch.

9. The method of claim 8, wherein synchronizing the engine speed comprises controlling the engine in an engine speed control mode prior to the activation of the clutch.

10. Method for controlling a powertrain system including an engine couplable via an engine disconnect clutch to a hybrid transmission, comprising:
controlling the engine to generate an input torque responsive to achieving a change in activation of the engine disconnect clutch, comprising managing a reactive torque load across the engine disconnect clutch by modifying an engine torque command to achieve a balance between a torque output of the internal combustion engine and a torque output of the torque machines; and
coincidently controlling operations of torque machines to generate an output torque at an output member of the hybrid transmission responsive to an operator torque request.

11. The method of claim 10, wherein controlling the engine to generate an input torque responsive to achieving a change in activation of the engine disconnect clutch comprises modifying engine torque to reduce a load on the clutch prior to a deactivation of the clutch.

12. The method of claim 11, wherein modifying engine torque to reduce the load on the clutch prior to the deactivation of the clutch comprises modifying engine torque to reduce a clutch reactive torque.

13. The method of claim 11, wherein the deactivation of the clutch comprises exhausting a clutch torque capacity, and wherein modifying engine torque occurs prior to exhausting the clutch torque capacity.

14. The method of claim 13, further comprising controlling operation of the engine in an engine speed control mode subsequent to the deactivation of the clutch.

15. The method of claim 10, wherein controlling the engine comprises synchronizing the engine speed with a speed of an input member of the hybrid transmission prior to an activation of the clutch.

16. The method of claim 15, wherein synchronizing the engine speed comprises controlling the engine in an engine speed control mode prior to the activation of the clutch.

* * * * *